(12) United States Patent
Lohtia et al.

(10) Patent No.: US 8,364,170 B2
(45) Date of Patent: *Jan. 29, 2013

(54) LOCATION SENSITIVE MESSAGING

(76) Inventors: Sunit Lohtia, San Rafael, CA (US);
Joseph H. Astroth, Jr., San Rafael, CA (US)

(*) Notice: Subject to any disclaimer, the term of this patent is extended or adjusted under 35 U.S.C. 154(b) by 102 days.

This patent is subject to a terminal disclaimer.

(21) Appl. No.: 12/929,941

(22) Filed: Feb. 25, 2011

(65) Prior Publication Data

US 2011/0159887 A1    Jun. 30, 2011

Related U.S. Application Data

(63) Continuation of application No. 11/437,041, filed on May 19, 2006, now Pat. No. 7,899,468.

(51) Int. Cl.
*H04W 24/00* (2009.01)

(52) U.S. Cl. ............ 455/456.1; 455/456.2; 455/456.3; 455/456.5; 455/456.6; 455/457

(58) Field of Classification Search .................. None
See application file for complete search history.

(56) References Cited

U.S. PATENT DOCUMENTS

| | | | |
|---|---|---|---|
| 5,508,707 A | 4/1996 | LeBlanc | |
| 5,559,707 A | 9/1996 | DeLorme | |
| 5,963,866 A | 10/1999 | Palamara | |
| 6,091,956 A | 7/2000 | Hollenberg | |
| 6,282,489 B1 | 8/2001 | Bellesfield | |
| 6,490,522 B2 | 12/2002 | Sugiyama | |
| 6,498,982 B2 | 12/2002 | Bellesfield | |
| 6,510,379 B1 | 1/2003 | Hasegawa | |
| 6,542,812 B1 | 4/2003 | Obradovich | |
| 6,609,005 B1 | 8/2003 | Chern | |
| 6,810,323 B1 | 10/2004 | Bullock | |
| 6,868,410 B2 | 3/2005 | Fortin | |
| 7,039,640 B2 | 5/2006 | Miller | |
| 7,110,773 B1 | 9/2006 | Wallace | |
| 7,113,795 B2 | 9/2006 | Somani | |
| 7,286,931 B2 | 10/2007 | Kawasaki | |
| 7,899,468 B2 * | 3/2011 | Lohtia et al. | 455/456.1 |
| 2002/0065604 A1 | 5/2002 | Sekiyama | |
| 2002/0072848 A1 | 6/2002 | Hamada | |
| 2002/0173905 A1 | 11/2002 | Jin | |

(Continued)

FOREIGN PATENT DOCUMENTS

| | | |
|---|---|---|
| DE | 19953398 | 5/2001 |
| EP | 1176840 | 1/2002 |

(Continued)

OTHER PUBLICATIONS

"Toyota Prius Navigation," http://www.trilog.org/~chilcote/ToyotaPrius/prius-nav.html, 2 webpages, downloaded Sep. 28, 2005.

(Continued)

*Primary Examiner* — Nimesh Patel
(74) *Attorney, Agent, or Firm* — William H. Ballman

(57) ABSTRACT

Methods including computer program products for receiving a request from a first device, the request incorporating a message. One or more users from a first set of one or more users are selected where each of the selected one or more users is associated with a second device that is in a proximity to a current location of the first device. The message and the current location of the first device are sent to each of the second devices associated with the selected one or more users.

24 Claims, 8 Drawing Sheets

U.S. PATENT DOCUMENTS

| | | |
|---|---|---|
| 2003/0114171 A1 | 6/2003 | Miyamoto |
| 2003/0125042 A1 | 7/2003 | Olrik |
| 2003/0157942 A1 | 8/2003 | Osmo |
| 2004/0103157 A1 | 5/2004 | Requena |
| 2004/0132465 A1 | 7/2004 | Mattila |
| 2004/0198386 A1 | 10/2004 | Dupray |
| 2004/0198397 A1 | 10/2004 | Weiss |
| 2004/0203866 A1 | 10/2004 | Sahinoglu |
| 2004/0203903 A1 | 10/2004 | Wilson |
| 2004/0229601 A1 | 11/2004 | Zabawskyj |
| 2005/0037748 A1 | 2/2005 | Sawano |
| 2005/0049785 A1 | 3/2005 | Vergin |
| 2005/0137994 A1 | 6/2005 | Fortin |
| 2005/0143097 A1 | 6/2005 | Wilson |
| 2005/0181810 A1 | 8/2005 | Camp |
| 2005/0249172 A1 | 11/2005 | Malik |
| 2005/0288036 A1 | 12/2005 | Brewer |
| 2005/0288859 A1 | 12/2005 | Golding |
| 2006/0259237 A1 | 11/2006 | De Silva |
| 2006/0265737 A1 | 11/2006 | Morris |
| 2007/0061073 A1 | 3/2007 | Kuo |

FOREIGN PATENT DOCUMENTS

| | | |
|---|---|---|
| EP | 1239392 | 9/2002 |
| GB | 2363289 | 12/2001 |

OTHER PUBLICATIONS

"Yahoo! Maps," http://www.maps/yahoo.com/maps_result?name=& addr+500+Arguello+S..., 1 webpage, downloaded Sep. 28, 2005.

"Google Maps," http://maps.google.com/, 1 web page, downloaded Sep. 28, 2005.

"Magellan Road Mate 760 North America," http://www.magellangps.com/en/products/product.asp?PRODID_1091, 3 webpages, downloaded Sep. 28, 2005.

"Yahoo! Driving Directions," http://maps.yahoo.com/pdd?ed-W.rUOOV.wil_AVMN266F518pW..., 2 webpages, downloaded Sep. 28, 2005.

U.S. Patent Appl. Entitled "Landmark Enhanced Directions," U.S. Appl. No. 11/241,540, filed Sep. 30, 2005.

U.S. Patent Appl. Entitled "Intelligent Reverse Geocoding," U.S. Appl. No. 11/367,911, filed Mar. 3, 2006.

U.S. Patent Appl. Entitled "Personal Location Code," U.S. Appl. No. 11/462,023, filed Aug. 2, 2006.

U.S. Patent Appl. Entitled "Personal Location Code Breaker," U.S. Appl. No. 11/462,015, filed Aug. 2, 2006.

Lin et al., "Exploiting a Search Engine to Develop More Flexible Web Agents," Web Intelligence, 2003, IEEE/WIC International Conference on Oct. 13, 2003, pp. 54-60.

International Search Report and Written Opinion from International Appl. No. PCT/US2007/061945 dated Jul. 17, 2007.

International Search Report and Written Opinion from International Appl. No. PCT/US2006/038554 dated Jan. 31, 2007.

International Search Report and Written Opinion from International Appl. No. PCT/US2007/069181 dated Sep. 11, 2007.

International Search Report and Written Opinion from International Appl. No. PCT/US2007/75130 dated Jun. 27, 2008.

International Search Report and Written Opinion from International Appl. No. PCT/US2007/75123 dated Sep. 3, 2008.

* cited by examiner

LOCATION SENSITIVE MESSAGING

CROSS REFERENCE TO RELATED APPLICATIONS

This application is a continuation of U.S. application Ser. No. 11/437,041, entitled "Location Sensitive Messaging", filed on May 19, 2006, now U.S. Pat. No. 7,899,468, the entire contents of which are hereby incorporated by reference.

This application is related to pending U.S. application Ser. No. 11/241,540, entitled "Landmark Enhanced Directions", filed on Sep. 30, 2005, the entire contents of which are hereby incorporated by reference.

This application is related to pending U.S. application Ser. No. 11/367,911, entitled "Intelligent Reverse Geocoding", filed on Mar. 3, 2006, the entire contents of which are hereby incorporated by reference.

BACKGROUND

FIG. 1 is an illustration of a network 100 and devices 110, 112, 114, 116, 118 and 120 connected to the network 100 by way of one or more wired or wireless links. The devices depicted in FIG. 1 are distributed spatially according to their current geographic locations. Typical wireless carriers can use various approaches for determining the current geographic location of a device. One high accuracy approach actives a Global Positioning System (GPS) receiver in a mobile device in order to develop a reasonably precise location of the mobile device at a point in time. A low accuracy approach maps the cellular tower that a mobile device is communicating with (e.g., based on signal strength) to a geographic region. An intermediate approach uses one or more last known GPS location(s) to determine a location of the mobile device based on an estimated trajectory. Other approaches are possible.

The network 100 can include tethered devices (120) such as personal computers, base stations (104, 106, 108) for providing wireless network service to mobile devices (110, 112, 114, 116, 118) such as cellular telephones, mobile computers, portable game systems, portable media devices, personal and automobile navigation systems (116), combinations of these, and generally any type of mobile computing device that is capable of communicating wirelessly. Examples of wireless networks include cellular telephone networks, Institute of Electrical and Electronics Engineers (IEEE) 802.11 based networks, IEEE 802.16 based networks, and other suitable networks. The network 100 can include one or more servers 102 for facilitating different network functions such as switching packets between devices or base stations, coordinating mobile device handoff in cellular networks, and supporting applications such as Short Message Service (SMS), Short Message Service Center (SMSC), Instant Messaging (IM), Multimedia Message Service (MMS), video phone, and email.

Users of mobile and tethered devices can exchange messages with one another. For example, if a user of the mobile device 114 wants send a message to friends that are using mobile devices 110 and 118, the user can specify the destination addresses associated with these devices (e.g., the friends' email account names) in a message sending application, such as electronic mail (email) or an IM application. Once the message is sent, the message is received by base station 108, transmitted by base station 108 to server 102, and relayed from server 102 to base stations 104 and 106. Base station 106 transmits the message to mobile device 118 and base station 104 transmits the message to mobile device 110.

If the user of mobile device 114 also wants to communicate their current location, the user can manually include this information in the message: "Meet me at the pub at Powel and Market in 15 minutes." However, having to type the location information can be cumbersome, especially using the minuscule keypads that are commonly included on mobile devices such as cellular telephones. In addition, the user may have no idea of where the user's friends are currently located, or whether they can actually arrive at the user's location within the specified time. The user may want to send a message just to friends who are within a certain distance from the user's current location, but the user has no way of knowing which friends are nearby.

SUMMARY

In general, in one aspect, embodiments of the invention feature receiving a request from a first device. The request incorporates a message. One or more users from a first set of one or more users are selected where each of the selected one or more users is associated with a second device that is in a proximity to a current location of the first device. The message and the current location of the first device are sent to each of the second devices associated with the selected one or more users.

These and other embodiments can optionally include one or more of the following features. The request specifies the proximity. The request identifies the first set of one or more users. The first set of one or more users is part of a buddy list, chat list or a Short Message Service (SMS) group. A geographic reference point is determined based on the current location of the first client device. The geographic reference point is incorporated into the current location of the first client device. The message can include one or more of text, still or motion images, voice, sounds, or streaming media. A route from one of the associated second devices to the first device is determined. The route is provided to the second device. The message includes a code indicating one of: the proximity or the first set of one or more users.

In general, in another aspect, embodiments of the invention feature receiving a request from a first device, the request incorporating a message and specifying a proximity. A current location for the first device is obtained. One or more users are selected from a first set of one or more users where each of the selected one or more users is associated with a second device that is in the proximity to the current location of the first device. The message and the current location of the first device are sent to each of the second devices associated with the selected one or more users.

These and other embodiments can optionally include one or more of the following features. The first set of one or more users is part of a buddy list, chat list or a Short Message Service (SMS) group.

Particular embodiments of the invention can be implemented to realize one or more of the following advantages. A user can publish their location information to other mobile or landline users. Users can decided whether or not to make available their location information to other users. Users are not aware of which users receive their location information. Users can send their location information to a group of users, such as buddy list. Moreover, a user can specify that a message be sent only to other users who are within a certain distance from the user's current location. Users can send messages to a location dating service that determines which other users are in the specified range. Directions between two users based on their current locations can be provided. Users that send messages to other users within their proximity are not aware of which users received the message. One or more codes can be included in a message to designate a proximity and potential recipients.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
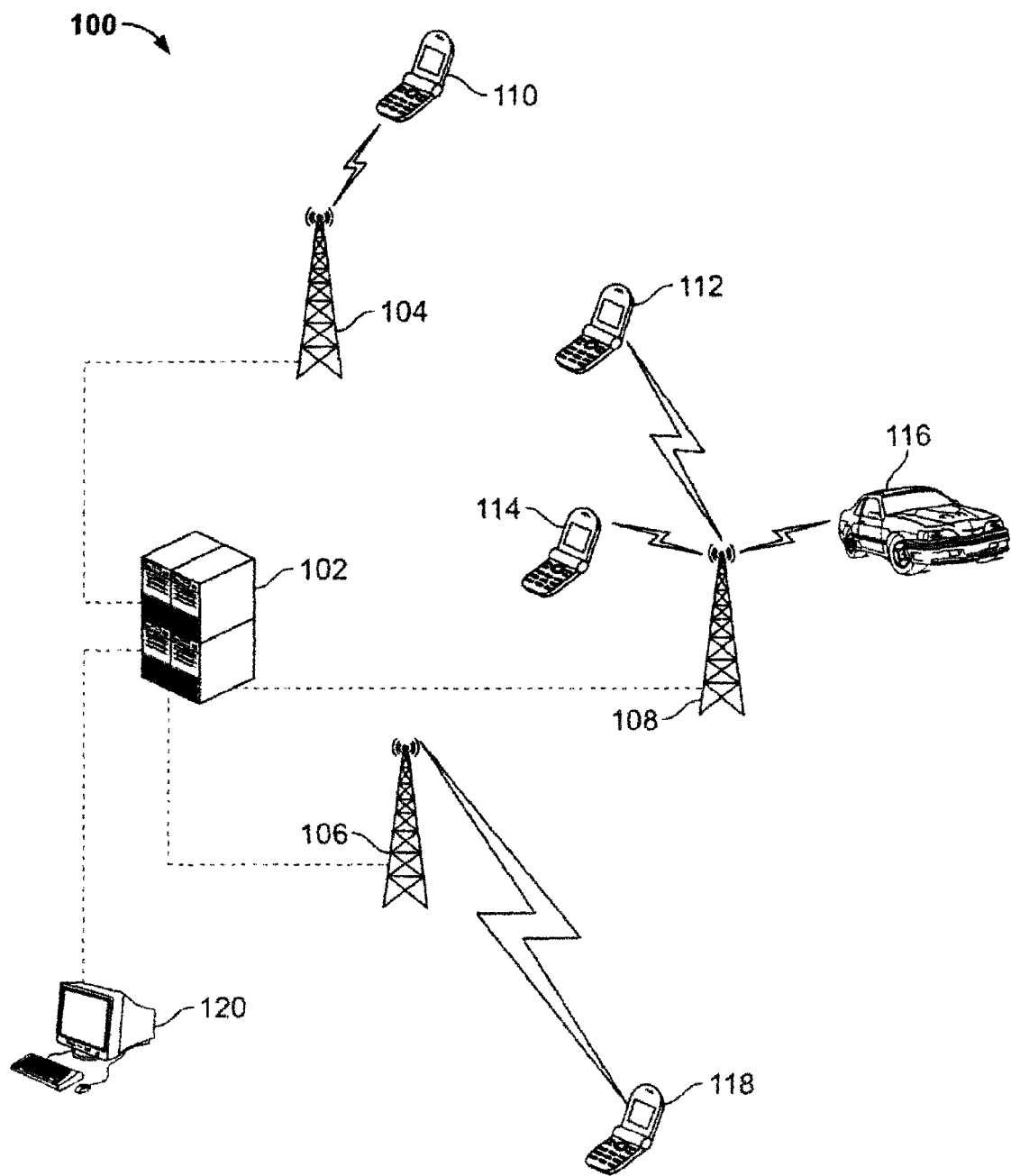
FIG. 1 illustrates a network.
Figure 2:
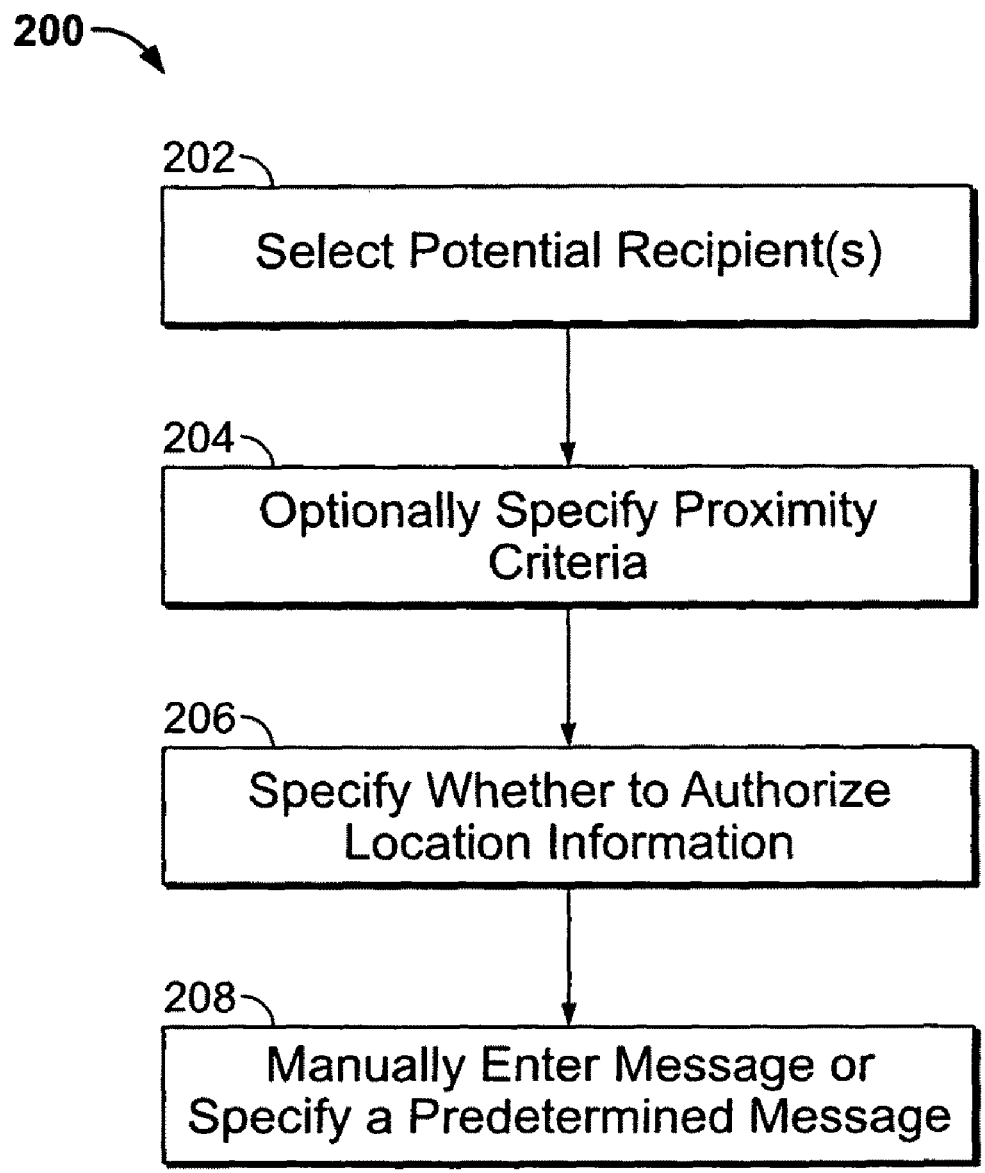
FIG. 2 is a flow diagram of an approach for sending a message.
Figure 3A:
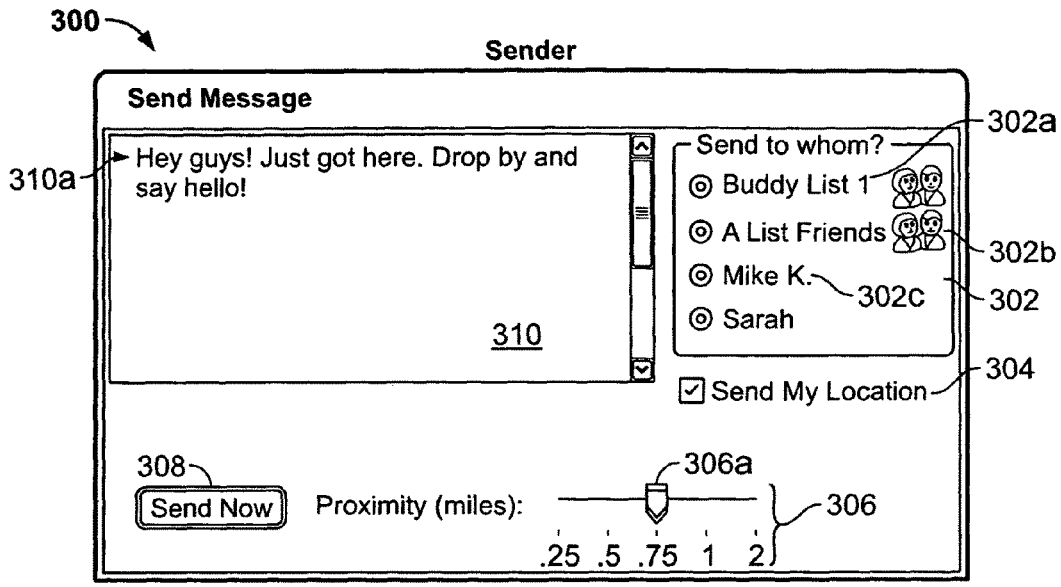
FIG. 3A illustrates a user interface for sending a message.

FIG. 2 is a flow diagram of an approach 200 for sending a message including the current location of a sender. A message can include one or more of text, still or motion images, voice, sounds, streaming media, and other suitable content. Before sending a message, a user can select, potential recipients of the message (step 202). For example, FIG. 3A illustrates a user interface 300 for composing and sending a message as might be presented on tethered or mobile devices. Although a graphical user interfaces are illustrated throughout this discussion, other user interfaces are possible including non-graphical user interfaces that are capable of recognizing speech, sounds, gestures, eye movement, and that are capable of synthesizing speech from text.

Potential recipients can be determined by default settings associated with a user profile, or can be interactively selected from a list, such as list 302, whereby a recipient refers to an IM buddy list, SMS group 302a, other list 302b, or one or more individuals 302c. Alternatively, potential recipients can also be specified through dynamically evaluated rules based on attributes of the recipients. For example, a rule could be used to select friends who like to play pool. In a further alternative, potential recipients can be specified by including a code in the message, such as a phrase or a number. The code can be associated with a user profile stored on the sending device or on a server. In one implementation, location sensitive messaging can be used in dating application. A user can send a message to a destination that identifies a dating service or use a message code that specifies a dating service, for example. The dating service can determine a set of recipients for the message based on the user's dating profile and the proximity of the recipients to the user's current location.

A user can optionally specify that a message only be sent to devices located within a specified or default proximity surrounding the current location of the user's device (step 204). For example, through use of a proximity control 306 in user interface 300 (FIG. 3A), the user can move a slider 306a to increase or decrease the diameter of a proximity zone surrounding the current location of the user's device. Alternative, the proximity can be specified by including a code in the message, such as a phrase or a number. The code can be associated with a user profile store on the sending device or on a server.

Figure 4:
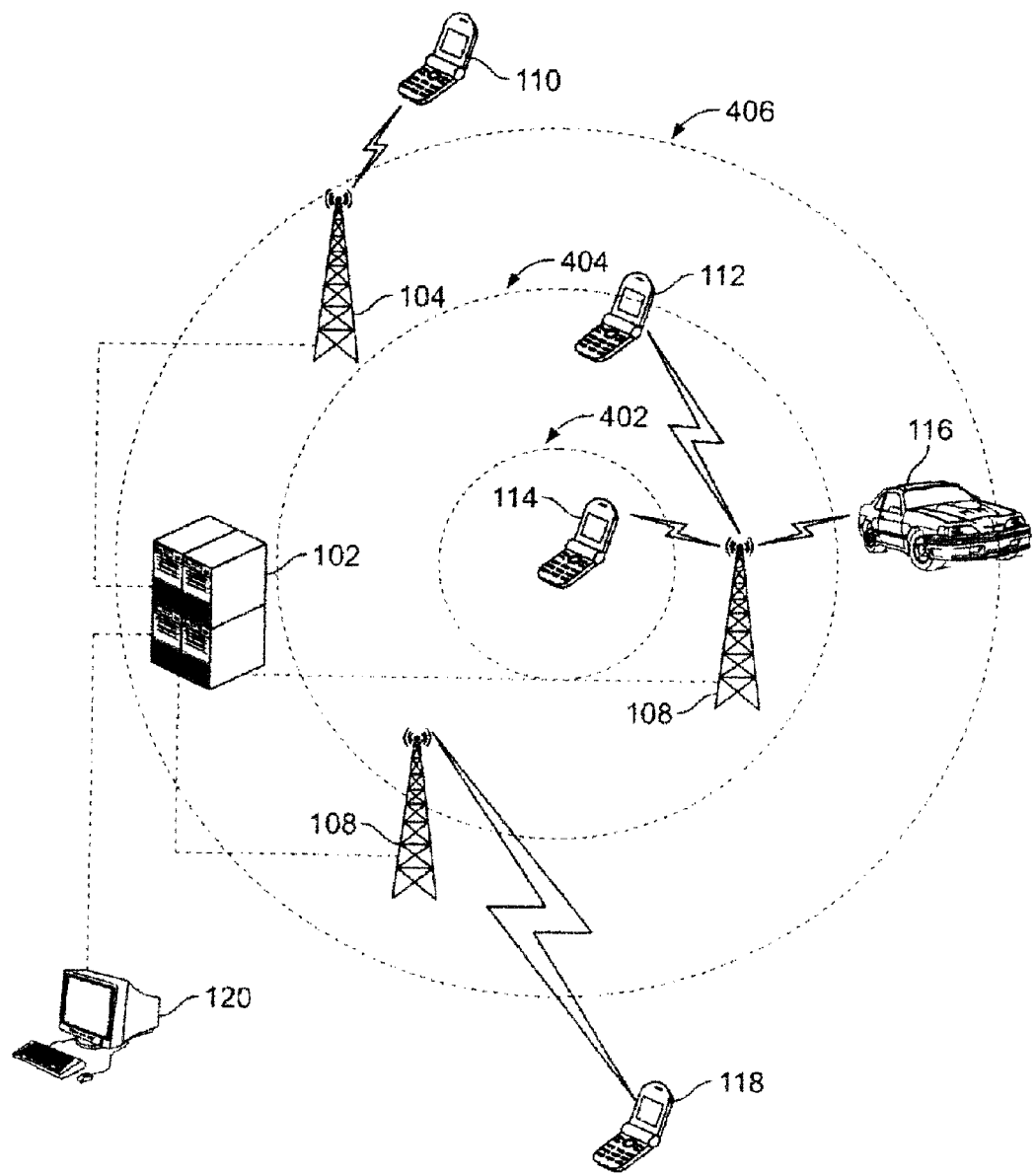
FIG. 4 illustrates a spatially distributed network with proximity zones.

FIG. 4 illustrates proximity zones (402, 404, 406) of increasing size surrounding the current location of a user's device. The devices depicted in FIG. 4 are distributed spatially based on their current geographic locations. In this example, there are three proximity zones. The first zone 402 represents a first area about the current location of mobile device 114. There are no devices in the first zone 402 other than the user's mobile device 114. The second zone 404 encompasses the first zone 402 and is also centered about the current location of mobile device 114. Devices in the second zone 404 include 114 and 112. Similarly, a third zone 406 encompasses both the first 402 and second 404 zones, and is also centered about the current location of mobile device 114. Devices in the third zone 406 include 114, 112 and 116. Devices outside of the third zone include devices 110, 118 and 120. There can be any number of proximity zones. In a further implementation, a proximity zone is a non-circular shape. For example, a proximity zone can be shaped to exclude unpopulated areas or bodies of water.

Figure 3B:
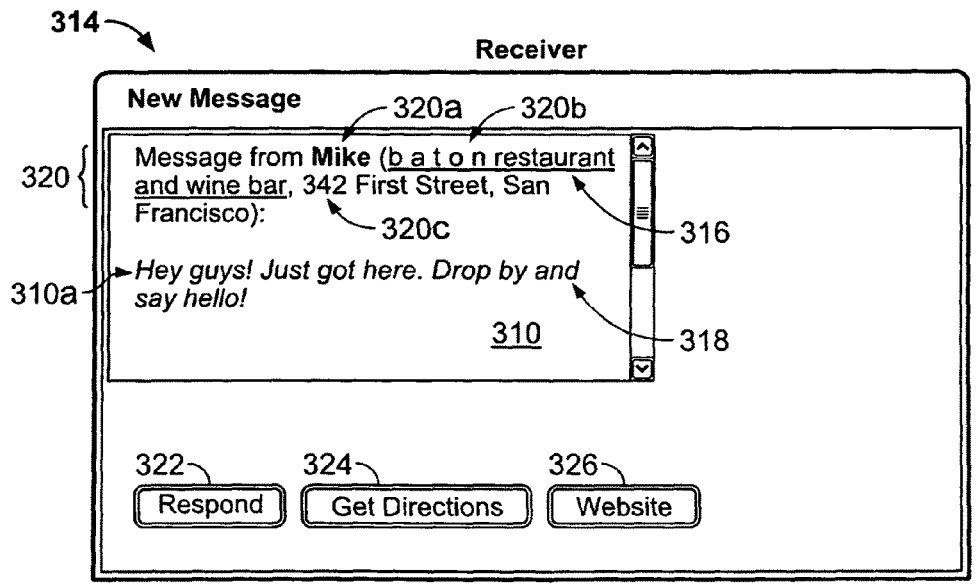
FIG. 3B illustrates a user interface for receiving a message.

Users can specify whether or not their location information should be sent along with the message to potential recipients (step 206). For example, checkbox 304 in user interface 300 (FIG. 3A) can be selected to authorize publication of the user's device location with the message. FIG. 3B illustrates a user interface 314 for presenting a received message 310a, and capable of presenting location information for the sender of a received message 310a. For example, in the message area 310 message header 320 includes the name of the sender 320a ("Mike"), the name of a restaurant 320b ("baton") where the sender is located, and the street address of the restaurant 320c ("324 First Street, San Francisco").

The location information can include one or more of a street address or a geographic reference point such as a road segment, an intersection, or a point of interest. A point of interest, for example, can be a landmark, a shopping center, a business establishment, a park, a sports facility, a wilderness area, a recreational area, or a geographic area. Rules or heuristics can be used to guide the format of location information based on factors such as the proximity of the location to a geographic reference point. This is fully described in pending U.S. application Ser. No. 11/367,911, entitled "Intelligent Reverse Geocoding", filed on Mar. 3, 2006, the entire contents of which are hereby incorporated by reference. Examples of location information formats for presentation in a user interface are included in TABLE 1.

TABLE 1

| LOCATION INFORMATION FORMAT | EXAMPLE OF LOCATION INFORMATION |
|---|---|
| At specific location | "At 323 Cole Street, San Francisco, CA" |
| Within distance of intersection | "Within 1.3 kilometers of Cole St. and Carl St." |

TABLE 1-continued

| LOCATION INFORMATION FORMAT | EXAMPLE OF LOCATION INFORMATION |
|---|---|
| At point of interest | "At Davies Medical Center" |
| Within distance of point of interest | "Within 3 miles of Deboce Park" |

Referring again to FIG. 2, users can manually enter a message to send to the potential recipients or specify a predefined message (step 208). For example, the user can enter a message 310a in message area 310 (FIG. 3A) and then select the send now button 308 to cause the message to be sent to potential recipients. Alternatively, the user can record a voice/video message. The message will be presented in the message area 310 of each potential receiver's user interface 314, assuming the potential receiver is within the specified proximity from the sender's mobile device and receives the message.

Figure 3C:
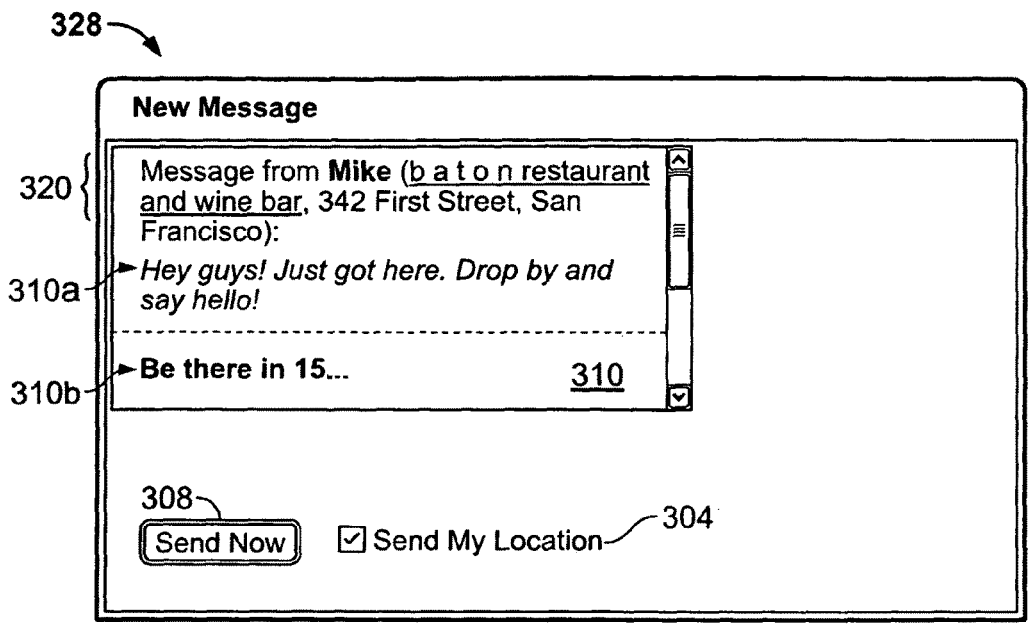
FIG. 3C illustrates a user interface for responding to a message.
Figure 3D:
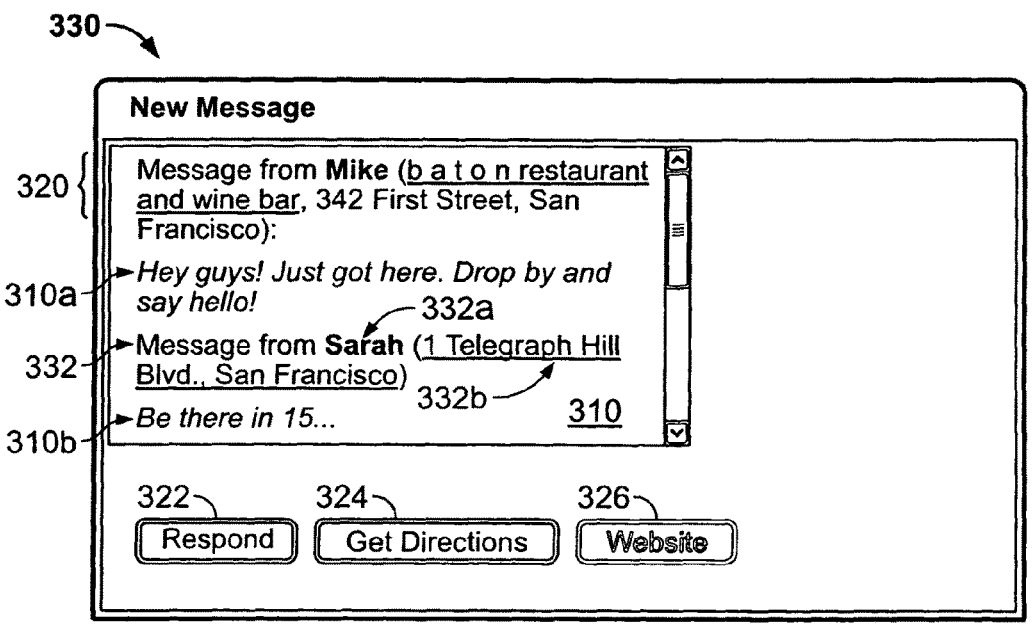
FIG. 3D illustrates a user interface for receiving a response to a message.
Figure 5:
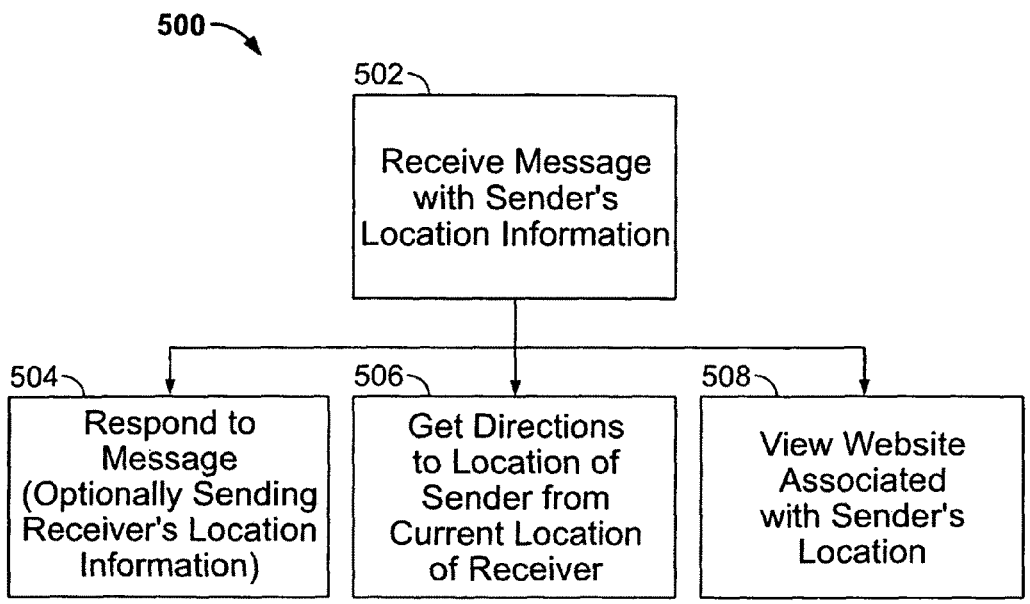
FIG. 5 is a flow diagram of an approach for receiving a message.

FIG. 5 is a flow diagram of an approach 500 for receiving a message. A message is received at a receiver's device and optionally includes the location information for the sender (step 502). As discussed above, FIG. 3B illustrates the receiver user interface 314 for presenting a received message 310a, including the presentation of location information 320b-c for the sender 320a of the message 310a. The receiver can respond to the message 310a (step 504) by selecting a respond button 322, for example. Selecting the respond button 322 causes a response user interface 328 (FIG. 3C) to be presented. This response user interface 328 includes a text area 310 to enter a response 310b, a checkbox 304 to permit inclusion of the receiver's location information with the response, and a send button 308 to cause the transmission of the response 310b and, optionally, the receiver's location information. The response 310b is received by the sender and presented by user interface 330 (FIG. 3D), including the identity 332a and optionally the location 332b of the user who sent the response.

Figure 3E:
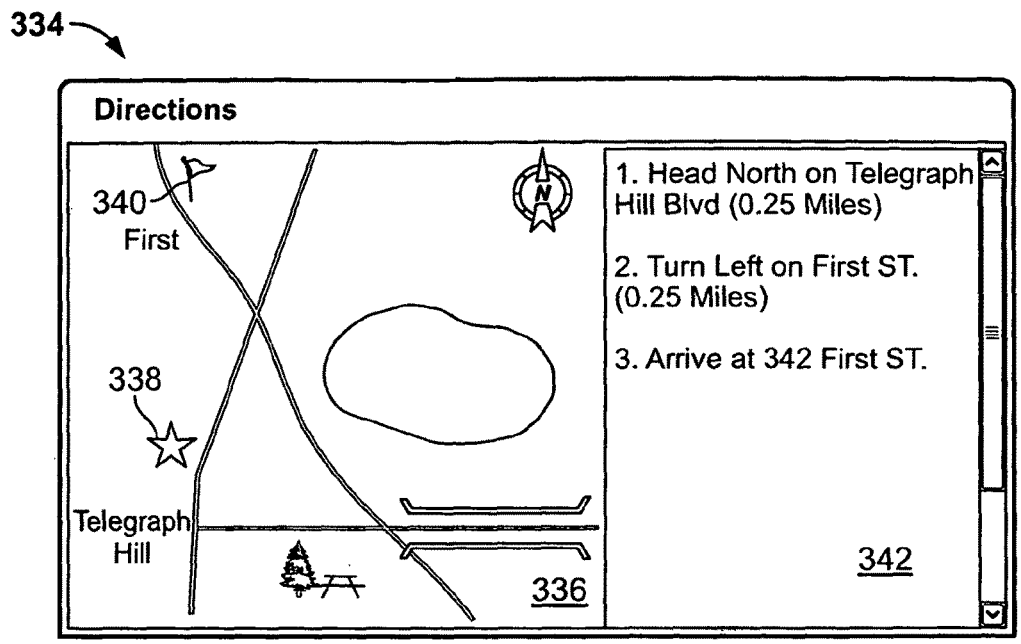
FIG. 3E illustrates a user interface for presenting directions.

The receiver can also obtain directions to the current location of the sender (step 506). For example, user who receives a message with a location for a sender can obtain directions to the sender's location from the user's current location by selecting a get directions button 324 in user interface 314 or 330. Selection of the button 324 causes presentation of user interface 334 in FIG. 3E which can include a graphical map 336 and step-by-step directions 342 for traveling to the sender's location. The map 336 can show the user's current location 338 and the location of the sender 340. In one implementation, the map 336 or directions 342 can include easy to locate landmarks. This is fully described in pending U.S. application Ser. No. 11/367,911, entitled "Intelligent Reverse Geocoding", filed on Mar. 3, 2006, the entire contents of which are hereby incorporated by reference. A landmark is an entity having a physical presence (e.g., a building, a sign, a sculpture, an entity that is perceptible through vision, touch, or sound) that the user will encounter while traveling a route dictated by the directions. In one implementation, a landmark is a branded reference point that designates a place of business or the location of at least one business, commercial signage, or an advertisement. In one implementation, symbols or marks (e.g., trademarks) representing landmarks can be included in the map 336 and/or the directions 342.

Figure 3F:
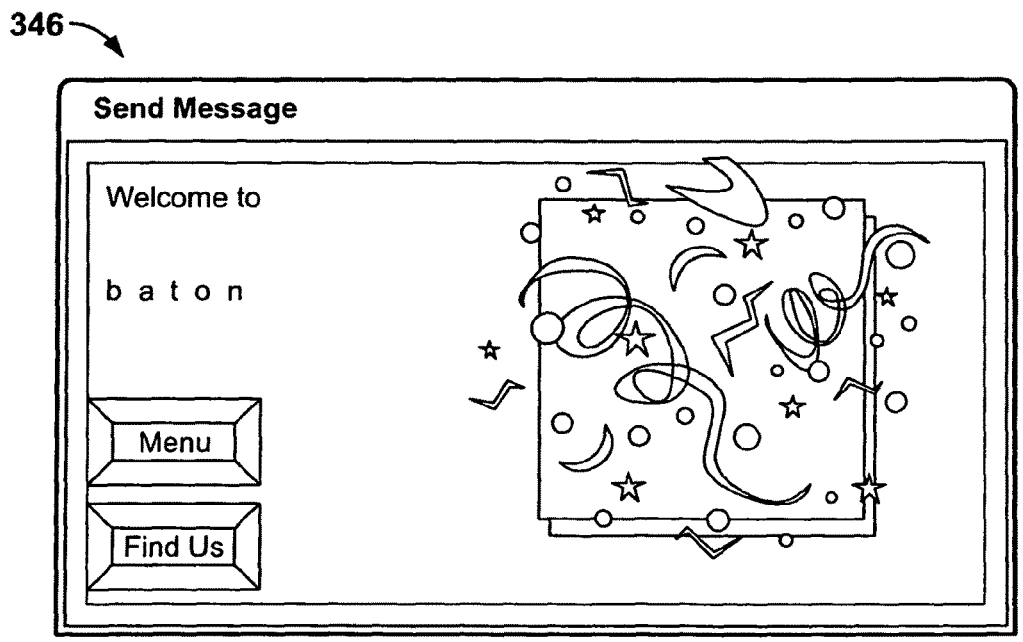
FIG. 3F illustrates a user interface for presenting a web page.

Finally, referring again to FIG. 5, a website associated with the sender's location can also be presented (step 508). A website could be associated with the sender's location if, for example, the sender's location corresponds to, or is in close proximity to, a point of interest. By selecting button 326, for instance, a website can be presented in user interface 346 (FIG. 3F).

Figure 6:
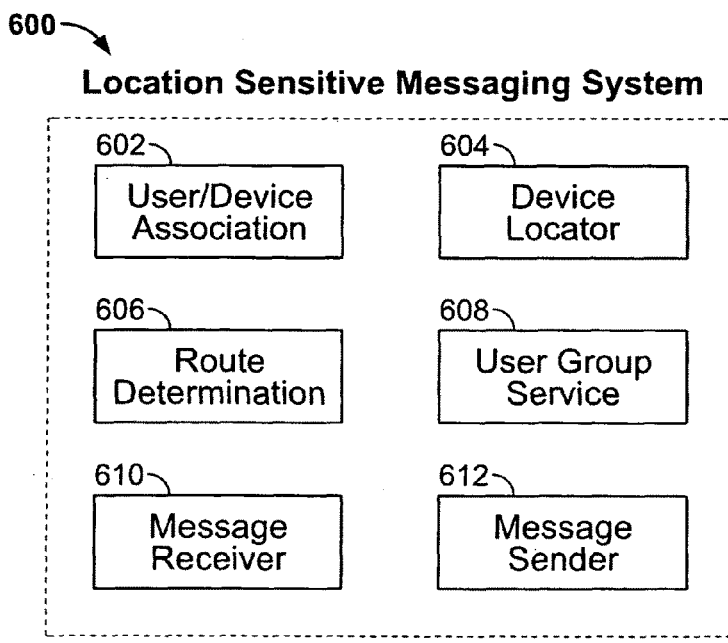
FIG. 6 illustrates a location sensitive messaging system.

FIG. 6 illustrates a location sensitive messaging system 600. A message receiver component 610 receives a message from a tethered or wireless sender device by way of one or more wired or wireless computer networks. The system 600 may be implemented with fewer or more components than illustrated and those components can be distributed over one or more computing devices connected by communication means such as one or more buses or networks, shared memory, or other means. A component can be implemented in software, firmware, as a specialized or general purpose computing device, or combinations of these.

The message can optionally include parameters specifying whether or not a user associated with the sender device has authorized publication of the user's current location, a proximity around the sender's current location, and identification of one or more potential recipients of the message. Alternative, one or more of these parameters can be associated with a sender's profile in the system 600 so that the sending device does not have to send them. In a further alternative, dynamically evaluated rules or heuristics can be used to specify when a user's location can be published based on time of day, location of the user, or other factors, for example. Likewise, rules and heuristics can be used to determine proximity and potential recipients. In a further implementation, if a potential recipient identifies a user group such as an IM group or buddy list, a user group service component 608 determines which users are members of the group and adds them to the one or more potential recipients.

The message receiver component 610 determines if the message is a request for message distribution or a request for directions. If the request is for message distribution, a user/device association component 602 identifies the devices associated with the potential recipients. A device location component 604 identifies which of the associated devices are within the proximity of the sender, if any. The message is then sent to the potential recipients that are within the specified proximity by the message sender component 612. If the user associated with the sending device has authorized the publication of their current location, the user's location information is included in the message sent by the message sender component 612. The device locator 604 can be used to determine the location information for the user, or this information can be determined by the user's device and included in the message. The location information can also include a geographic reference point as determined by a route determination component 606.

In one implementation, a request for directions from a user's current location to another user's location is received by the message receiver component 610. The request identifies the sender of the request whose current location serves as a starting route point, and can also identify the target user whose current location serves as the ending route point. The route determination component 606 first determines if the target user can be located based on whether the target user has authorized the publication of their location information, either in a recent message to the sender of the request or in a profile accessible by the system 600. If so, the route determination component 606 determines a step-by-step route from the starting route point to the ending route point and returns such to the requesting user by way of the message sender component 612. In another implementation, step-by-step directions are automatically included with location information so that a separate request for directions is unnecessary. In this case, the route determination component 606 can use the current location of the recipient (as determined by the device location 604) as the starting point for the route and the location of the sender as the end point for the route. Alternatively, a URL can be sent to the recipient which, when presented to and selected by a user, could initiate a Wireless Application Protocol (WAP) session that would allow the user to obtain a route to the sender.

Figure 7:
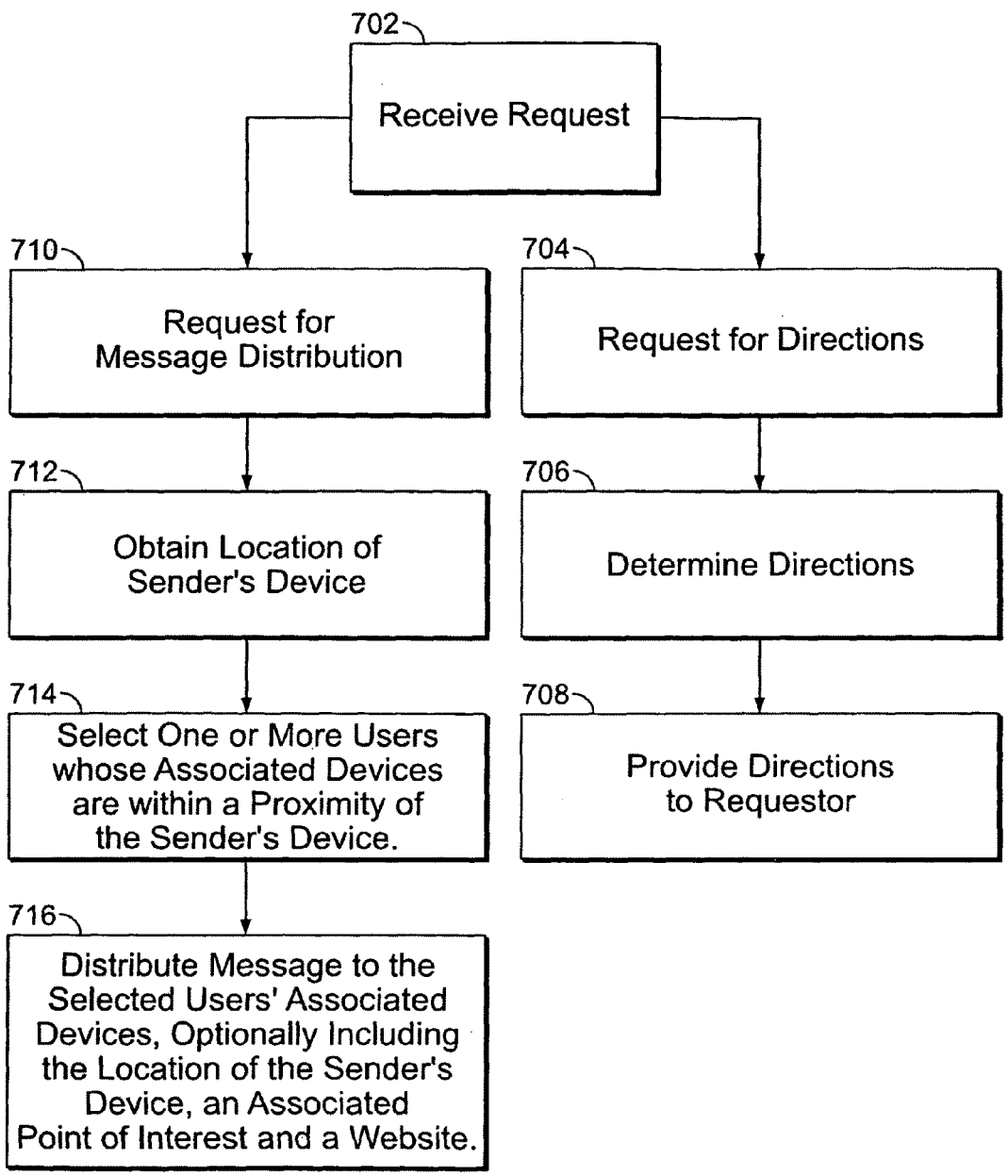
FIG. 7 is a flow diagram of an approach for responding to a request.

FIG. 7 is a flow diagram 700 of an approach for responding to a request. A request is received (step 702) by a message receiver component 610, for example. As discussed above, the message can include parameters specifying whether or not a user associated with the sending device has authorized publication of the user's current location, a proximity around the sender's current location, and identification of one or more potential recipients of the message. If the message is a request for message distribution (step 710), the current location of the sender's device is obtained (step 712). One or more potential recipients whose devices are within the proximity (if specified) are selected as recipients of the message (step 714). The message is then distributed to the potential recipients that are within the proximity (step 716) by the message sender component 612, for example. As described above, the distributed message can include the current location of the device associated with the user who sent the message, optionally include a geographic reference point and a route.

If the message is a request for directions (step 704), the request identifies the sender of the request whose current location serves as a starting route point, and can also identify the target user whose current location serves as the ending route point. For example, as described above a route determination component 606 can determine a step-by-step directions from the starting route point to the ending route point. The directions are returned to the requestor (step 708), e.g., by way of the message sender component 612.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method of communicating location information, comprising:
   receiving, from a first wireless device, a first data message;
   obtaining a proximity zone surrounding a current location associated with said first wireless device;
   selecting one or more user IDs from a first set of one or more user IDs, said selected one or more user IDs being associated with at least one second wireless device that is within said proximity zone;
   automatically appending said current location information associated with said first wireless device to said first data message;
   transmitting said first data message comprising said current location information associated with said first wireless device to said at least one second wireless device;
   receiving, said at least one second wireless device, a second data message comprising a request to transmit current location associated with said at least one second wireless device, to said first wireless device; and
   transmitting current location associated with said at least one second wireless device to said first wireless device.

2. The method of communicating location information according to claim 1, wherein:
   said first data message is at least one of a text message, an image message, a voice message, and a streaming media message.

3. The method of communicating location information according to claim 1, wherein:
   said first data message specifies said proximity zone.

4. The method of communicating location information according to claim 1, wherein:
   said received first data message requests said first set of one or more user IDs.

5. The method of communicating location information according to claim 1, wherein:
   said first set of one or more user IDs is part of at least one of a buddy list, a chat list and a Short Message Service (SMS) group.

6. The method of communicating location information according to claim 1, further comprising:
   determining a geographic reference point based on said current location of said first wireless device; and
   incorporating said geographic reference point into said current location of said first wireless device.

7. The method of communicating location information according to claim 1, wherein:
   said text message further includes at least one of an image, a voice, sound, and streamed media.

8. The method of communicating location information according to claim 1, further comprising:
   determining a route from said first wireless device to said at least one second wireless device; and
   providing said route to said first wireless device.

9. The method of communicating location information according to claim 1, wherein:
   said first data message includes a code indicating at least one of said proximity zone and said first set of one or more user IDs.

10. The method of communicating location information according to claim 1, wherein:
    said first data message identifies said first set of one or more user IDs.

11. The method of communicating location information according to claim 1, wherein:
    said first data message is comprised of at least one of an image, a voice, sound, and streamed media.

12. The method of communicating location information according to claim 1, wherein:
    determining a route from said at least one second wireless device to said first wireless device; and
    providing said route to said second wireless device.

13. An apparatus for communicating location information, comprising:
    a receiver to receive, from a first wireless device, a first data message and to receive, from a second wireless device, a second data message comprising a request to transmit current location associated with said second wireless device to said first wireless device;
    an obtainer to obtain a proximity zone surrounding a current location associated with said first wireless device;
    a selector to select one or more user IDs from a first set of one or more user IDs, said selected one or more user IDs being associated with said second wireless device that is within said proximity zone;
    an appender to automatically append said current location information associated with said first wireless device to said first data message; and
    a transmitter to transmit said first data message comprising said current location information to said second wireless device, and to transmit current location associated with said second wireless device to said first wireless device.

14. The apparatus for communicating location information according to claim 13, wherein:
said first data message is at least one of a text message, an image message, a voice message, and a streaming media message.

15. The apparatus for communicating location information according to claim 13, wherein:
said first data message specifies said proximity zone.

16. The apparatus for communicating location information according to claim 13, wherein:
said received first data message requests said first set of one or more user IDs.

17. The apparatus for communicating location information according to claim 13, wherein:
said first set of one or more user IDs is part of at least one of a buddy list, a chat list and a Short Message Service (SMS) group.

18. The apparatus for communicating location information according to claim 13, further comprising:
a determiner to determine a geographic reference point based on said current location of said first wireless device; and
an incorporator to incorporate said geographic reference point into said current location of said first wireless device.

19. The apparatus for communicating location information according to claim 13, wherein:
said first data message further includes at least one of an image, a voice, sound, and streamed media.

20. The apparatus for communicating location information according to claim 13, further comprising:
a determiner to determine a route from said first wireless device to said second wireless device; and
a provider to provide said route to said first wireless device.

21. The apparatus for communicating location information according to claim 13, wherein:
said text message includes a code indicating at least one of said proximity zone and said first set of one or more user IDs.

22. The apparatus for communicating location information according to claim 13, wherein:
said first data message identifies said first set of one or more user IDs.

23. The apparatus for communicating location information according to claim 13, wherein:
said first data message is comprised of at least one of an image, a voice, sound, and streamed media.

24. The apparatus for communicating location information according to claim 13, wherein:
a determiner to determine a route from said at least one second wireless device to said first wireless device; and
a provider to provide said route to said second wireless device.

* * * * *